United States Patent [19]
Suzuki

[11] Patent Number: 5,445,268
[45] Date of Patent: Aug. 29, 1995

[54] CASE FOR A TAPE CASSETTE

[75] Inventor: Hisao Suzuki, Miyagi, Japan

[73] Assignee: Sony Corporation, Tokyo, Japan

[21] Appl. No.: 273,434

[22] Filed: Jul. 11, 1994

[30] Foreign Application Priority Data

Jul. 20, 1993 [JP] Japan .................. 5-179229

[51] Int. Cl.$^6$ .......................................... B65D 85/575
[52] U.S. Cl. .................. 206/387.1; 206/493
[58] Field of Search ............... 206/307, 387, 444, 493, 206/308.3, 308.1; 220/355, 356

[56] References Cited

U.S. PATENT DOCUMENTS

| | | | |
|---|---|---|---|
| 2,065,651 | 12/1936 | Burton | 220/356 |
| 3,532,211 | 10/1970 | Gellert | 206/387 |
| 3,587,841 | 6/1971 | Devejian | 206/387 |
| 4,046,255 | 9/1977 | Ackeret | 206/387 |

FOREIGN PATENT DOCUMENTS

| | | | |
|---|---|---|---|
| 1430995 | 1/1966 | France | 220/356 |
| 2221784 | 10/1974 | France | 206/387 |
| 2513333 | 10/1976 | Germany | 206/387 |
| 2700556 | 1/1978 | Germany | 206/387 |
| 2099793 | 12/1982 | United Kingdom | 206/387 |

OTHER PUBLICATIONS

U. Kingdom partial search report, Sep. 1994 Appl. No. GB 9414452.4.

Primary Examiner—Jimmy G. Foster
Attorney, Agent, or Firm—Ronald P. Kananen

[57] ABSTRACT

A case for receiving a tape cassette having a pair of reel hubs and front openings includes a case body and a lid. The case body is made of a synthetic resin or the like material and comprises a rectangular plate-like portion and a plurality of continuous side walls extending upright from along the sides of the rectangular plate-like portion. Further, the case body is provided, on either one of the upper edges of the opposing two side walls extending along the longer sides of the rectangular plate-like portion thereof, with a tape cassette reception operating section for allowing a part of a tape-shaped recording medium projecting from the tape cassette openings to be withdrawn into the cassette. The lid is made of a metal or the like and includes a rectangular plate-like portion and a plurality of continuous side walls extending upright from along the sides of the plate-like portion. The lid closes the case body by being placed over the latter. The case body is provided with a plurality of projections on the outer surfaces of the side walls thereof so that when the case body is covered by the lid, the projections engage the inner surfaces of the side walls of the lid thereby preventing the case body from falling down.

17 Claims, 13 Drawing Sheets

CASE FOR A TAPE CASSETTE

BACKGROUND

1. Field of the Invention

The present invention relates to a tape cassette case. More particularly, the present invention relates to such type of tape cassette case that having a case body and a lid.

2. Background of the Invention

As an audio tape cassette, one that is shown in FIG. 1 has been known. As shown, a tape cassette 101 has a pair of hubs 103 and 104 around which a magnetic tape 102 is wound and cassette halves 105 connected a pair of halves for rotatably receiving these hubs therebetween.

The upper and lower surfaces 106 of the cassette halves 105 are each provided with a plurality of tape-guide insert holes 107, . . . 107, an insert hole 108 into which either the shaft of a tape supply reel or that of a tape takeup reel is inserted and an insert hole 109 into which the shaft of the other reel is inserted.

In the front surface 110 of each cassette half 105, there are provided an opening 111 and a pair of openings 112 into which the head and a pair of pinch rollers of a recording and/or reproducing unit are inserted, respectively.

When the tape cassette 101 of the above structure is loaded in a recording and/or reproducing apparatus such as a tape recorder (not shown), the tape guide pins of the recording and/or reproducing apparatus are inserted into the tape guide insert holes 107, . . . 107 drilled in the upper and lower surfaces 106 of the cassette halves 105.

At the same time, into the reel shafts insert holes 108 and 109 there are respectively inserted the shafts of the tape supply and takeup reels of the recording and/or reproducing apparatus. When inserted, these shafts respectively engage the hubs 103 and 104 to allow the letters to rotate therewith.

Further, into the magnetic head insert opening 111 and the pinch roller insert openings 112 provided at the front surface 110 of each cassette halves 105, there are respectively inserted the magnetic head and the pair of pinch rollers of the recording and/or reproducing apparatus.

Thus, recording or reproduction is performed with the magnetic head while the magnetic tape 102 is caused to travel by the pinch rollers at a predetermined feeding speed.

In the case of the tape cassette 101 shown in FIG. 1, the magnetic tape 102 partly exposed outside from the magnetic head insert opening 111 and the pinch roller insert openings 112 provided at the front face 110 of the cassette halves 105.

Consequently, if the tape cassette 101 is carried as it is, there is the possibility that the magnetic tape 102 is damaged because of its being adhered with dust or getting bruised.

That is, there may arise the problem that dust enters the magnetic head insert opening 111 or pinch roller insert openings 112 thereby giving rise to an adverse effect on the magnetic tape 102.

In order to solve the above-mentioned problem, the tape cassette 101 is housed in a case 121 shown in FIG. 5 for storage and transport.

As shown in FIG. 1, the case 121 includes a case body 124 and a lid 122 rotatably fixed to the case body by means of a hinge 123. The lid 122 includes a plate-like portion 122a and a pocket 122b at one side thereof.

To allow the tape cassette 101 to be received into the case 121, the tape cassette 101 is inserted into the pocket 122b of the lid 122 along the inner surface of the plate-like portion 122a and then the lid 122 is closed with respect to the case body 124. In the closed state of the case 121, hub locks 125 and 126 are brought into engagement with the hubs 103 and 104 through the reel shaft insert holes 108 and 109 of the tape cassette 101 so that the rotations of the hubs 103 and 104 are hindered and the magnetic tape 102 is prevented from becoming loosened when it is stored or transported.

The tape cassette case 121 shown in FIG. 1 has had the problem that when it is closed, the case body 124 and the cover 122 become integral with each other and as a result, the user becomes perplexed to open the lid 122 as he is unable to make sure the boundary of the lid 122 and the case 121.

SUMMARY OF THE INVENTION

It is, therefore, an object of the present invention to provide a tape cassette case which can solve the above-mentioned problem.

According to one aspect of the present invention, there is provided a tape cassette case provided with a pair of reel hubs and openings at the front face thereof. The tape cassette case includes an upper case member and a lower case member such that the upper case member is formed of a rectangular plate-like portion and a plurality of continuous side walls extending upright from along the sides of the rectangular plate-like portion and similarly, the lower case member is formed of a rectangular plate-like portion and a plurality of continuous rectangular side walls extending upright from along the sides of the former. Further, the lower case member is provided with an operation section at the upper edge of either one of the opposing two side walls along the longer sides of the rectangular plate-like portion so that a part of the tape-shaped recording medium projecting outside from one of the openings of the tape cassette is withdrawn in the tape cassette by the presence of that operating section. The lower case member is closed by being covered with the upper case member.

According to another aspect of the present invention, there is provided a tape cassette case including an upper case member and a lower case member such that each of the two members of the case is formed of a rectangular plate-like portion and a plurality of continuous side walls extending upright from along the sides of the plate-like portion. Further, the lower member of the case is provided with at least a projection on any of the outer surfaces of the continuous side walls at a position adjacent the plate-like portion thereof so that the projection engages the corresponding inner surface of the one of the continuous side walls of the upper case member. Consequently, when the upper case member is caused to cover the lower case member, the lower case member is closed without becoming disengaged from the upper case member because of the existence of the projection.

According to still another aspect of the present invention, there is provided a tape cassette case including an upper case member and a lower case member such that each of the two members is formed of a rectangular plate-like portion and a plurality of continuous side walls extending upright from along the sides of the plate-like portion and further, the lower case member is provided on the plate-like portion thereof with support sections which project from the plate-like portion so as to support areas of the tape cassette. The lower case member is closed by being covered with the upper case member.

According to a further aspect of the present invention, there is provided a tape cassette case provided with a pair of reel hubs and including an upper case member and a lower case member such that each of the two members is formed of a rectangular plate-like portion and a plurality of continuous side walls extending upright from along the sides of the former and forth, the lower case member is provided with a recess extending from the upper edge of one of the side walls down to the side of the plate-like portion adjoining that side wall. The lowercase member is closed by being covered by the upper case member.

As described above, the present invention has various advantages, namely:

since the case body forming itself the lower case member is provided, at the upper edge of either one of the opposing side walls corresponding to the longer sides of the rectangular plate-like portion thereof, with the operating section for allowing a part of the tape-shaped recording medium projecting from the tape cassette opening to be withdrawn into the cassette, the tape-shaped recording medium can be prevented from being caught by the upper edge of that side wall or from being sandwiched between the tape cassette and the case thereby avoiding the recording medium getting damaged.

Further, the outer side wall of the lower case member is provided, at a position near the plate-like portion thereof, with at least a projection to engage the inner surface of the corresponding side wall of the upper case member, it is possible to prevent the lower case member from falling down when the upper case member is held to cover the lower case member.

In addition, the tape cassette is provided with the support sections for supporting the support areas for the tape cassette so that the tape cassette is prevented from being deformed when it is received within the case.

Lastly, since the tape cassette case of the present invention includes a case body and a lid to cover the case body therewithin, the user is no more perplexed as to how to find out the boundary between the case body and the lid. Further, one of the rectangular side walls of the case body is provided with a recess extending from the upper edge of that wall to the adjoining side of the plate-like portion of the case body, the tape cassette can be taken out from the case body with ease.

BRIEF DESCRIPTION OF THE DRAWINGS

The present invention will be more readily understood with reference to the accompanying drawings wherein:

FIG. 8A shows a positional relationship between the magnetic tape and the case body when the tape cassette is at its position shown in FIG. 7, FIG. 8B shows a state in which the tape cassette is somewhat lowered from its position shown in FIG. 8A and FIG. 8C shows a state in which the tape cassette is completely received within the case body;

FIG. 14A is a front view illustrating a positional relationship between the magnetic tape and the case body when the tape cassette is positioned as shown in FIG. 13; FIG. 14B is a plan view of the same;

FIG. 15A is a front view illustrating a inserting the tape cassette to the case body from the position illustrated in FIGS. 14A and 14B; FIG. 15B is a plan view of the same;

FIG. 16A is a front view of the tape cassette case and FIG. 16B is a plan view of the same.

DESCRIPTION OF THE INVENTION

Figure 1:
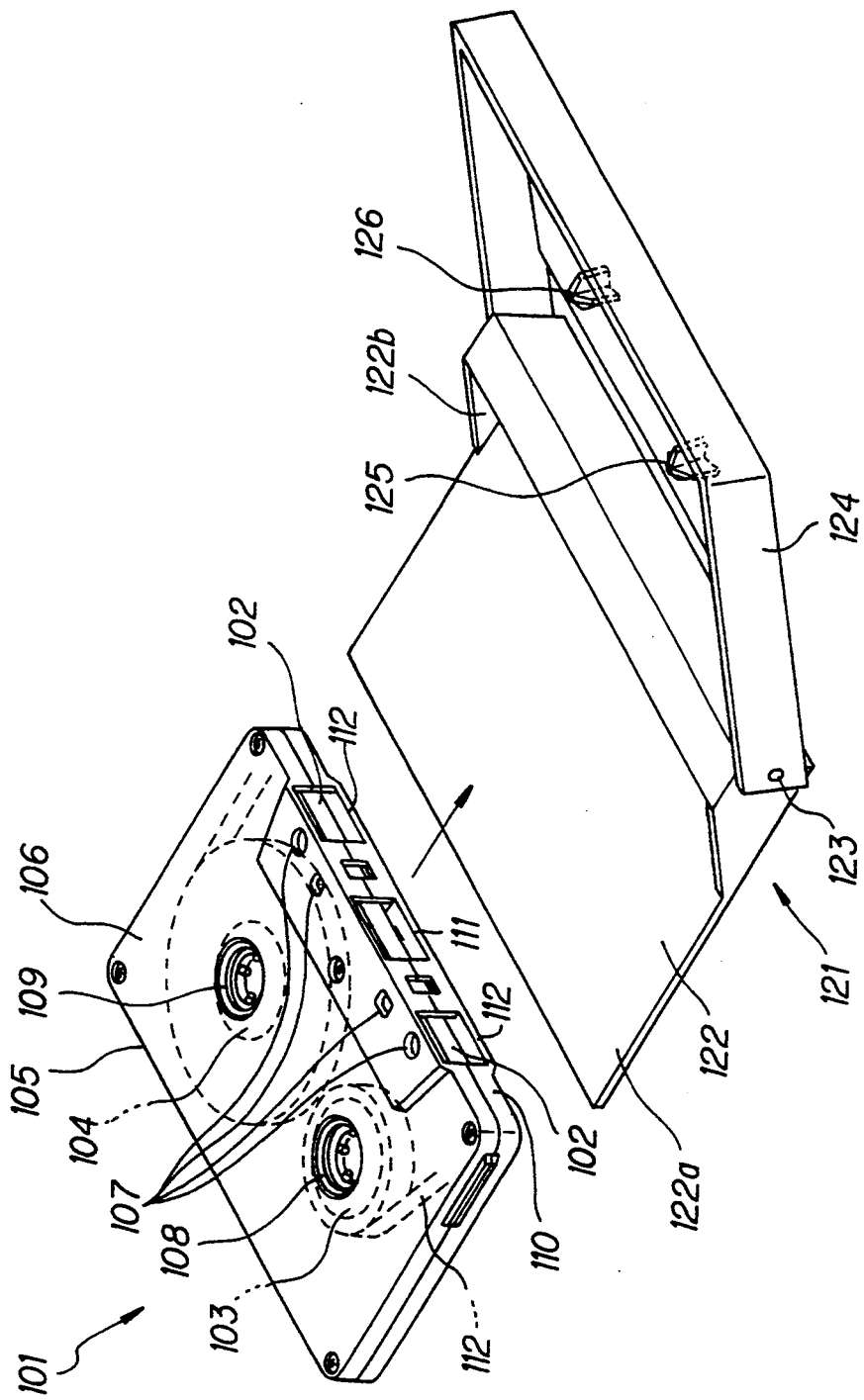
FIG. 1 is a perspective view of a typical tape cassette case accompanied with a tape cassette to be received therein.
Figure 2:
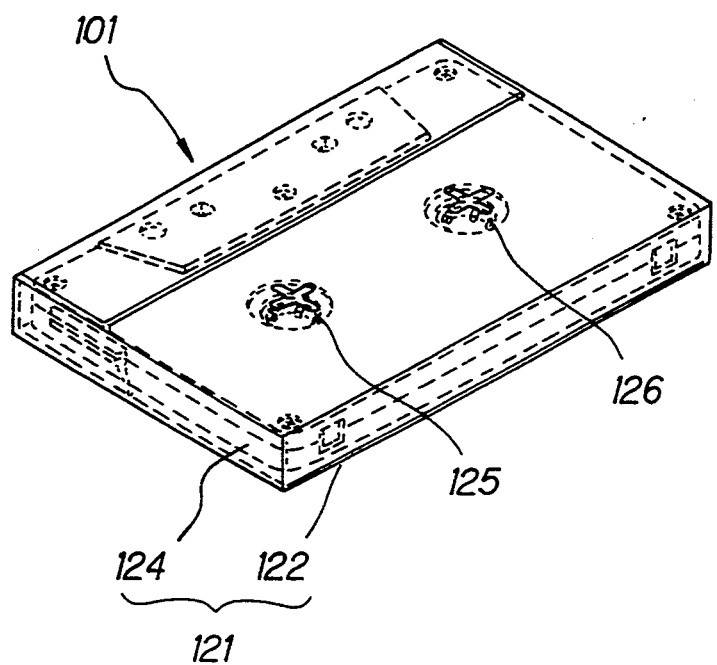
FIG. 2 is a perspective view of the tape cassette case of FIG. 1 especially when the tape cassette of FIG. 1 is received within the tape cassette case.

A tape cassette case according to a first embodiment of the present invention will now be described with reference to the accompanying drawings wherein like parts are designated by like reference numerals.

Figure 3:
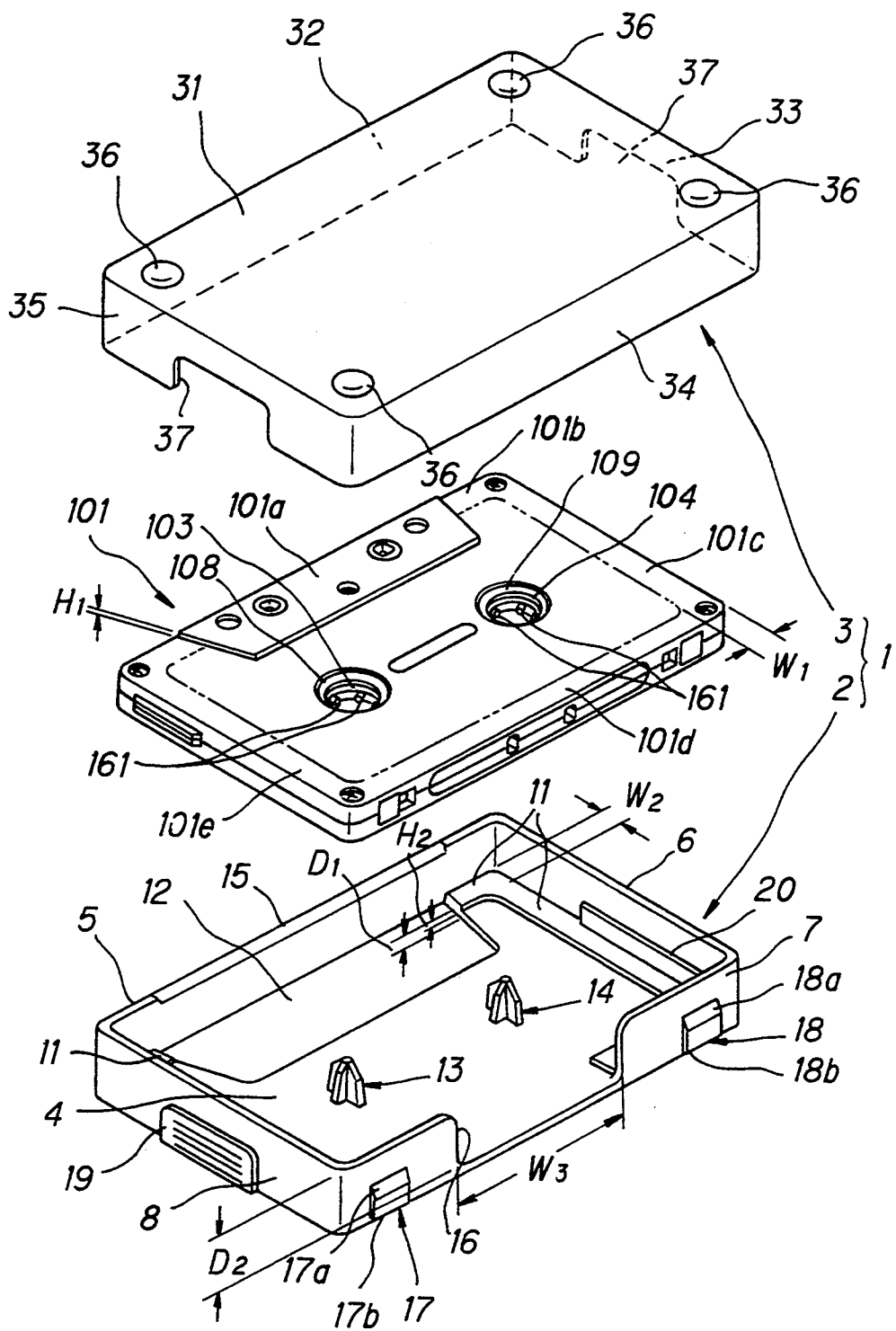
FIG. 3 is an exploded perspective view of a tape cassette case according to one embodiment of the present invention, taken in association with a tape cassette to be received in the case.

As shown in FIG. 3, a tape cassette case 1 includes a case body 2 and a lid 3. Further, as shown in FIGS. 3, 4, 5 and 6, the case body 2 includes a rectangular bottom surface 4 and continuous side walls 5, 6, 7 and 8. A tape cassette 101 is received within a space enclosed by the bottom surface 4 and the side walls 5, 6, 7 and 8 which are integral with one another to form the case body 2 made of a synthetic resin material such as ABS. Further, the case body 2 has a bottom plate 2a made of metal such as attached to the lower surface of the bottom surface 4 as shown in FIG. 6.

The bottom surface 4 of the tape cassette case is provided with supports 11 for supporting support areas 101b, 101c, 101d and 101e formed on the four sides of each of the rectangular upper and lower surfaces of the tape cassette 101, a concave portion 12 into which a trapezoidal bulged portion 101a of the tape cassette 101 is inserted and a pair of hub locks 13 and 14. The hub locks 13 and 14 are so formed as to project from the inner surface of the bottom portion 4 at an interval corresponding to the space between the hubs 103 and 104 of the tape cassette 101.

The first side wall 5 has an operating section (or flank) 15 in the direction away from a head insert opening 111 and a pair of pinch roller insert openings 112. The operation section 15 is formed at the upper edge of the first side wall 5 so as to have a length larger than that of the trapezoidal bulged portion 101a. The operating section 15 is a flank which inclines from the upper edge of the first side wall 5 toward the bottom surface 4. The third side wall 7 opposing the first side wall 5 is provided with a recess 16 for facilitating the removal of the tape cassette 101 from the tape cassette receiving space. As shown in FIGS. 3 and 5, the third side wall 7 is cut from the upper edge thereof to the bottom surface 4 by a width $W_3$.

Figure 4:
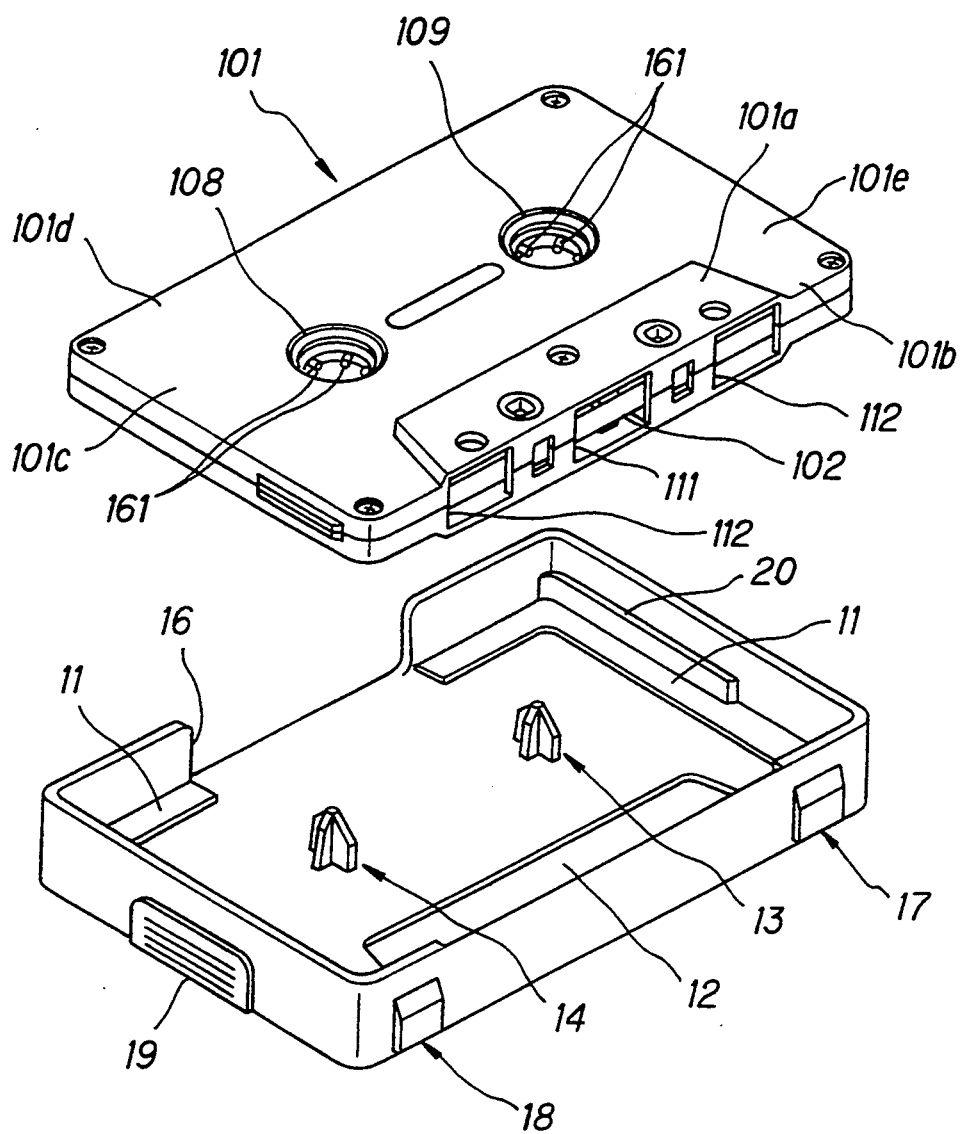
FIG. 4 is a perspective view of a case body forming part of the tape cassette case of FIG. 3, taken in association with a tape cassette.
Figure 5:
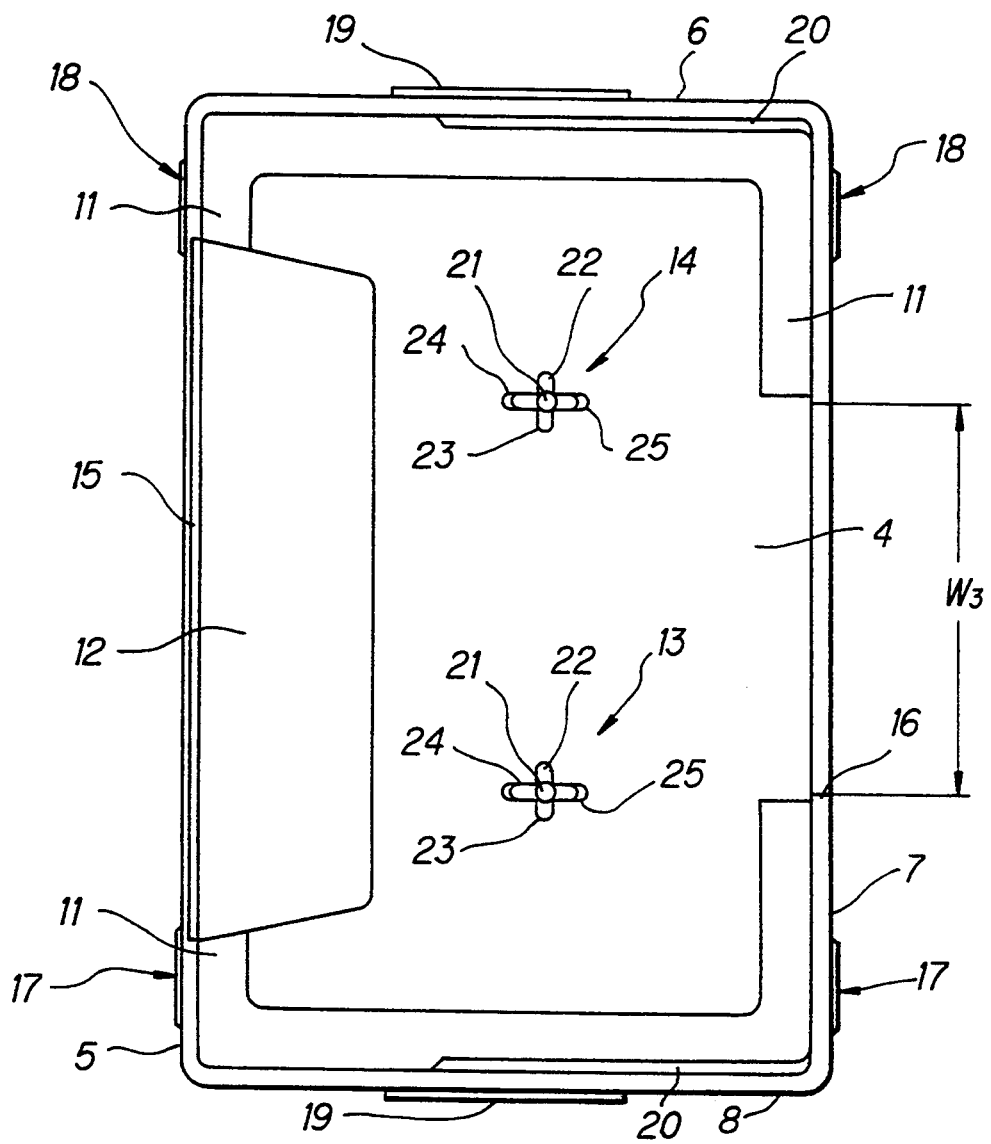
FIG. 5 is a plan view of the case body of FIG. 4.
Figure 6:
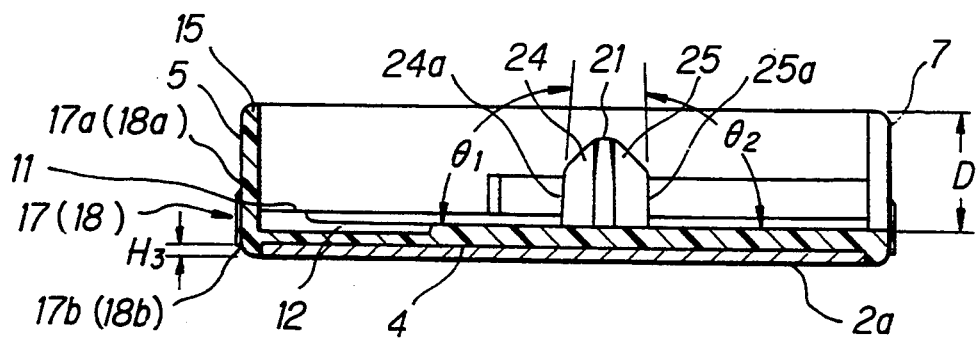
FIG. 6 is a sectional view of the case body of FIG. 4.

As shown in FIGS. 3, 4 and 5, the first and third side walls 5 and 7 are respectively provided with projections 17 and 18 to engage the lid at positions near the bottom surface 4. In the first embodiment, these projections are integrally formed with the case body at positions near the corners of the case body 2.

The second and fourth side walls 6 and 8 of the case body 2 are respectively provided, at the outer surfaces thereof, with finger-touch projections 19 and 19 which enter recesses formed in a lid 3 to be described later. Similarly, at the inner surfaces of the side wall portions 6 and 8, there are provided projections 20 and 20 for positioning the tape cassette 101 in the cassette receiving space.

As shown in FIG. 5, the tape cassette supports 11 are formed on the upper surface of the bottom portion 4 in such a manner that one of the supports 11 extends from one end of the concave portion 12 to one end of the recess 16 of the third side wall 7 via the first side wall 5 and the second side wall 6 while the other support 11 extends from the other end of the concave portion 12 to the other end of the recess 16 of the third side wall 7 via the first side wall 5 and the fourth side wall 8. Each of the supports 11 has, as shown in FIG. 3, a width $W_2$ corresponding to the width $W_1$ of each of the support areas 101b–101e of the tape cassette 101.

As shown in FIG. 6, each of the supports 11 has a height $H_2$ slightly smaller than the height $H_1$ of the trapezoidal bulged portion 101a of the tape cassette 101.

The concave section 12 for the insertion of the bulged portion 101a is, in other words, formed on the bottom surface 4 so as to extend along the first side wall 5 and to divide the support 11 into two parts.

The concave portion 12 for the insertion of the bulged portion 101a has a depth $D_1$ which is slightly smaller the height $H_2$ of the support 11 bearing the relationship of $H_1 < (H_2 + D_1)$ with respect to the height of the trapezoidal bulged portion 101a.

Upon insertion of the tape cassette 101 into the tape cassette receiving space, the support areas 101b–101e of the tape cassette 101 comes to be supported by the supports 11 and the lower surface of the portion of the tape cassette 101 other than the trapezoidal bulged portion 101a is held floating from the bottom surface 4 of the case body 2 while the lower surface of the bulged portion 101a is held floating from the bottom surface of the concave portion 12 for the insertion of the bulged portion 101.

The pair of hub locks 13 and 14 are respectively inserted into the reel shaft insert holes 108 and 109 of the tape cassette 101 to thereby engage the hubs 103 and 104 and as a result, the hubs 103 and 104 are locked unrotatable by means the hub locks 13 and 14 with the tape cassette 101 kept received within the case 1.

As shown in FIG. 5, the hub locks 13 and 14 are each provided with a shaft 21 embedded in the bottom portion 4 so as to project upward from the latter, first and second blades 22 and 23 extending substantially parallel to the first and third side walls 5 and 7 from the shaft 21 and third and fourth blades 24 and 25 extending substantially parallel to the second and fourth side walls 6 and 8 from the shaft 21. The first and second blades 22 and 23 and the third and fourth blades 24 and 25 intersect one another at right angles so as to form a cross when viewed from above. The third and fourth blades 24 and 25 engage a plurality of engaging projections 161 . . . 116 formed on the inner peripheries of the hubs 103 and 104 thereby preventing the rotations of the hubs 103 and 104.

As shown in FIG. 6, an outer side surface 24a of the third blade 24 is so formed as to make a tilt angle of $\theta_1 = 91°$ with respect to the bottom surface 4. Further, an outer side surface 25a of the fourth blade 25 is so formed as to make a tilt angle of $\theta_2 = 94°$ with respect to the bottom surface 4.

As described above, the reason why the tilt angles $\theta_1$ and $\theta_2$ of the outer side surfaces 24a and 25a of the third and fourth blades are differentiated from each other is that by so doing, the withdrawal of the tape cassette 101 from the case body 2 is facilitated.

The above-mentioned operating section 15 is formed inside the upper edge of the first side plate 5 so as to extend over the area facing the magnetic head insert opening 111 and the pinch roller insert openings 112 of the tape cassette 101 received in the tape cassette receiving space.

The operating section 15 is formed by cutting the upper edge of the first side wall 5 from the outer surface side toward the inner surface side at a predetermined angle, i.e., by performing a C-face cutting.

The cassette takeout recess 16 is formed in such a manner that as shown in FIGS. 5 and 6, the central portion of the third side wall 7 is cut out to a predetermined depth $D_2$ and a predetermined width $W_3$ from the upper end surface toward the lower end surface thereof.

The lid engagement projections 17 and 18 are provided on both side portions of the first and third side walls 5 and 7, (adjacent to both side portions of the second and fourth side walls 6 and 8) at positions near the corners of the bottom surface 4 as shown in FIG. 5.

As shown in FIG. 3, the lid engagement projections 17 and 18 are formed substantially rectangular when viewed from the front. These projections 17 and 18 have upper portions having tilt surfaces 17a and 18a and lower portions 17b and 18b, respectively, of which the lower portions 17b and 18b extend from the lower ends of the first and third side walls 5 and 7 up to a height H₃, respectively, as shown in FIG. 6. The tilt surfaces 17a and 18a function as guides for the lid 3 when the lid 3 is caused to cover the case body 2 from above. Further, when the lid 3 (which will be described in detail hereinafter) is placed over the case body 2, the lower portions 17b and 18b of the projections 17 and 18 come to lie above the level of the top edge of the lid 3. The length of each of the projections 17 and 18 extending outside from the side wall portions 5 and 7 is so determined that it is large enough to be able to expand the side wall of the lid 3 from inside when the lid 3 is caused to cover the case body 2.

The finger-touch projections 19 and 19 are formed in such a manner that substantially the central portions of the second and fourth side walls 6 and 8 are caused to project by the same width as that of the wall of the lid 3.

Next, let us describe the lid 3. As shown in FIG. 3, the lid 3 is formed of a rectangular upper surface portion 31 and first, second, third and fourth side walls 32, 33, 34 and 35 with the formation of a case body receiving space enclosed thereby so that the lid 3 is closed after the case body 2 is inserted into the space. The inner size of the lid 3 is somewhat larger than the outer size of the case body 2.

Figure 11:
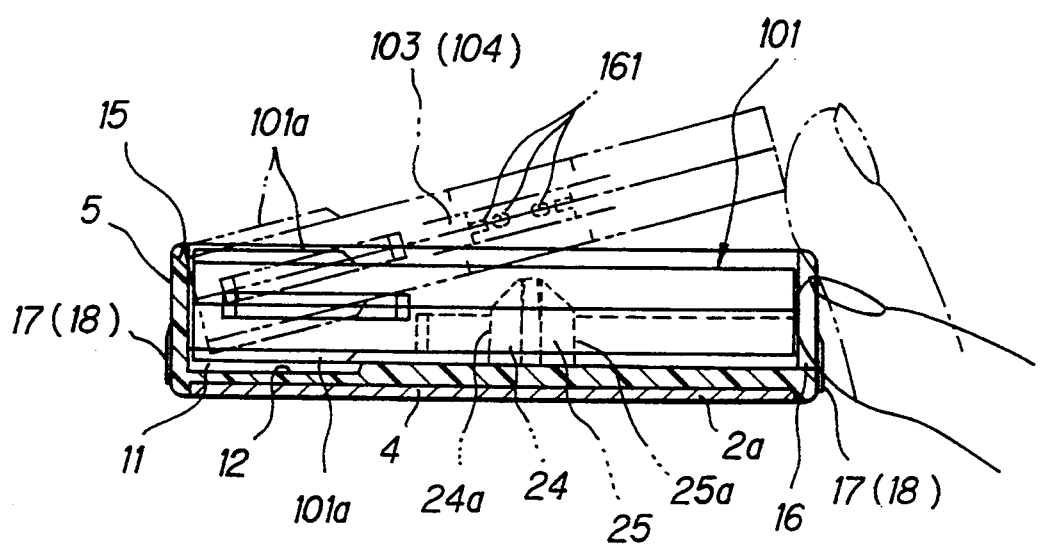
FIG. 11 is a sectional view of the tape cassette case of FIG. 10, especially when a tape cassette received in the case is taken out.

As shown in FIG. 11, the upper surface portion 31 of the lid 3 is provided, at the corners thereof, with a plurality of projections 36, . . . , 36 facing downward so as to press the tape cassette 101 within the case body 2 against the supports 11. The tape cassette 101 received within the case body 2 is regulated of its vertical movement in the case by the supports 11 and the projections 36.

Further, the side walls 33 and 35 are respectively provided with recesses 37, 37 allowing the insertion there into of the finger-touch projections 19 of the case body 2.

Next, the method of insertion and withdrawal of the tape cassette into, and from, the tape cassette case 1 according to the first embodiment of the present invention will be described.

The insertion of the case body 2 into the tape cassette 101 may be performed by the following procedures.

Figure 7:
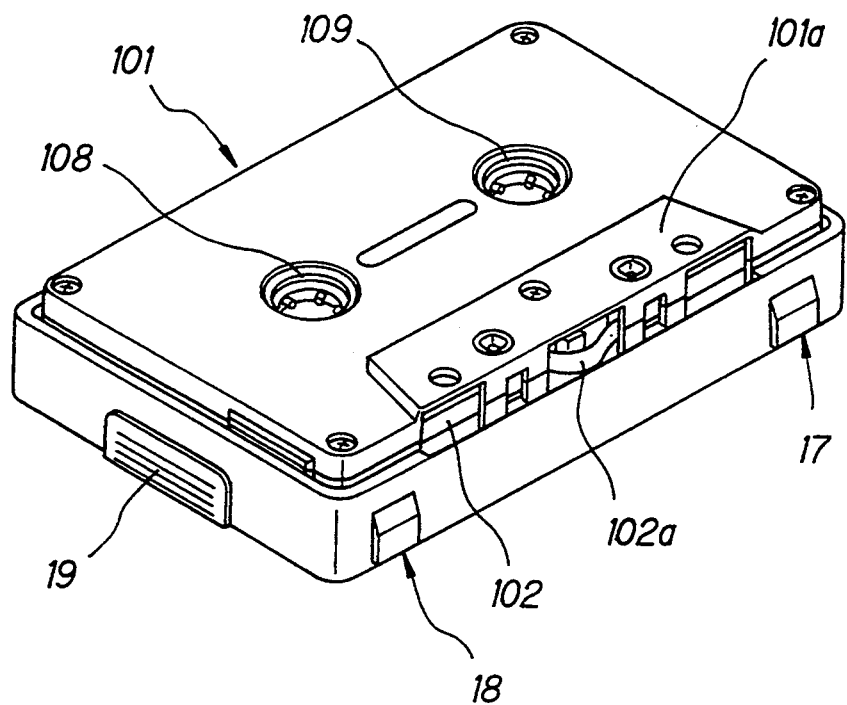
FIG. 7 is a perspective view of the case body of the tape cassette case of FIG. 4 especially in a state in which a tape cassette is received therein.
Figure 8A:
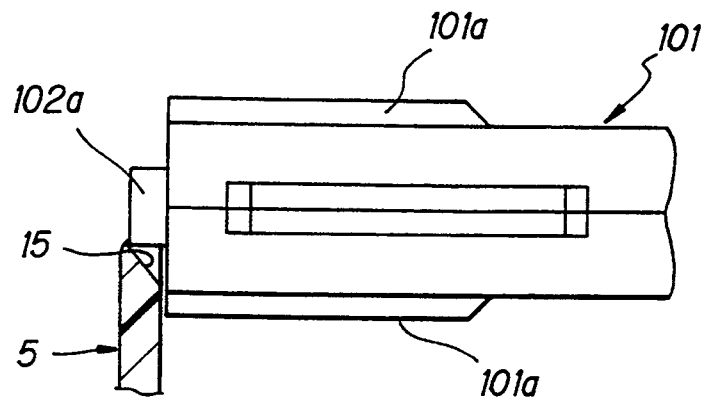
FIGS. 8A to 8C are enlarged sectional views, respectively, of an essential portion of the case body of the tape cassette case according to the first embodiment of the present invention, with the view being given for illustrating a state in which the tape cassette from which a part of a magnetic tape projects outside is received within the case body. That is.
Figure 8B:
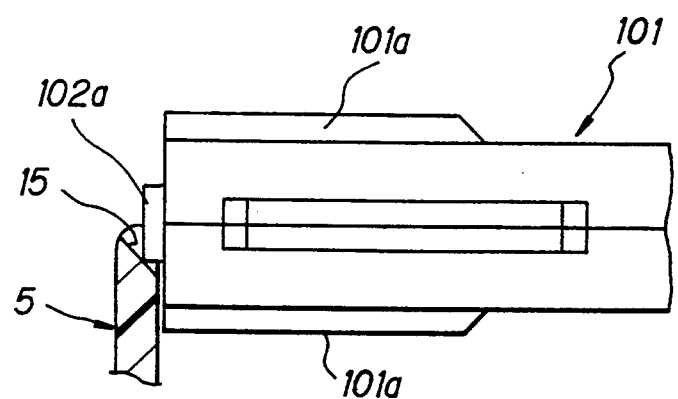
Figure 8C:
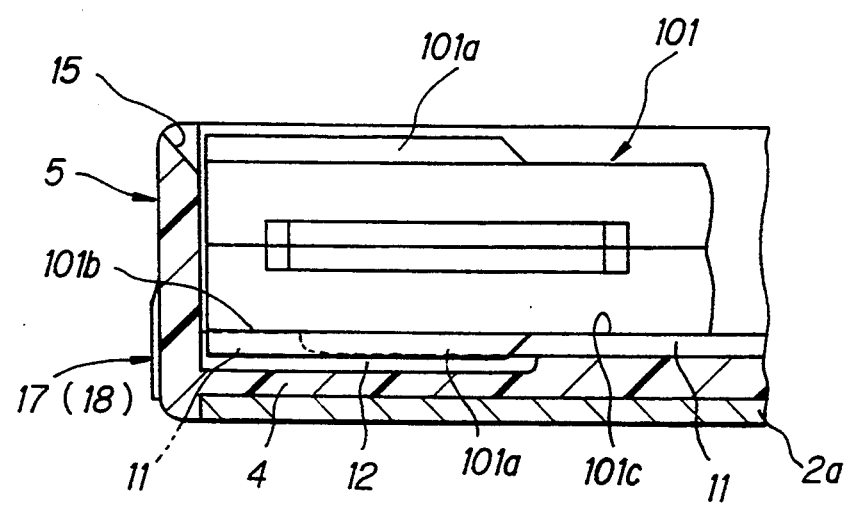

The tape cassette 101 is inserted into the case body 2 as if the tape cassette fell into the tape cassette receiving space of the case body 2. In this case, suppose that a part of the magnetic tape 102 should slightly projects from the head insert hole 111 or the pinch roller insert openings 112 of the tape cassette 101 as shown in FIG. 7. As shown in FIG. 8, the projection 102a of the magnetic tape 102 lies at the upper portion of the tilt surface of the operating section 15 when the tape cassette 101 is above the case body 2 but when the tape cassette 101 begins to be inserted within the case body 2, the projection 102a of the tape cassette 101 is somewhat thrusted into the tape cassette as shown in FIG. 8B. Further, upon insertion of the tape cassette 101 into the case body 2, the projection 102a of the magnetic tape 102 is thrusted into the tape cassette 101 by means of the operating section 15 and the first side wall 5. As a result, as shown in FIG. 8C, when the tape cassette 101 is completely in the tape cassette receiving space of the case body 2, the magnetic tape 102 is held within the tape cassette 101. The tape cassette 101 thus inserted into the case body 2 has the support areas 101b–101e supported by the support 111 of the case body 2a.

When the tape cassette 101 is received within the case body 2, the hub locks 13 and 14 which are formed on the bottom surface 4 of the case body 2 enter the tape cassette 101 via the reel shaft insert holes 108 and 109 thereof and engage the hubs 103 and 104. Consequently, in the state shown in FIG. 8C, the rotations of the hubs 103 and 104 are hindered by the hub locks 13 and 14.

Figure 9:
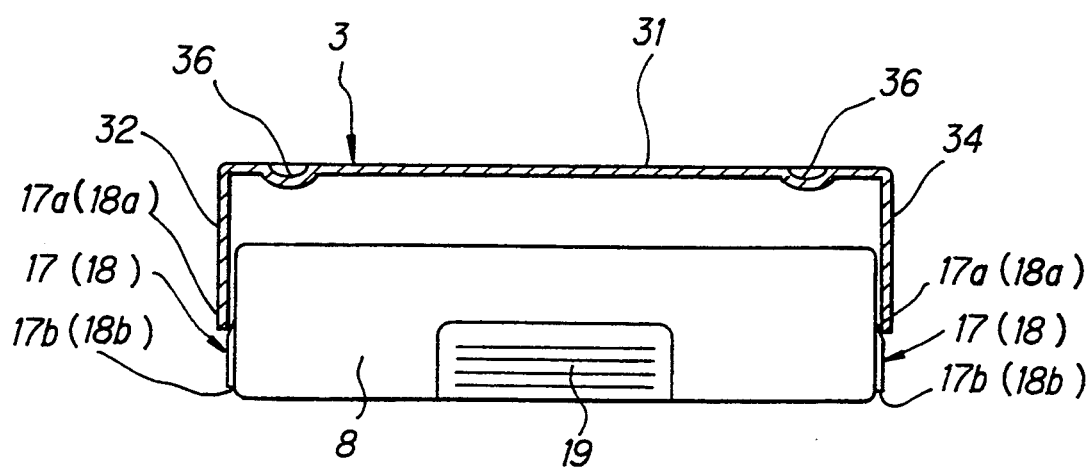
FIG. 9 is a view showing a state in which the case body part of the tape cassette case according to the first embodiment of the present invention is inserted into a lid with which it forms the tape cassette case.

As described above, when the tape cassette 101 has been completely received within the case body 2, the case body 2 may be covered with the lid 3 allowing the case body 2 to be inserted into the case body receiving space of the lid 3.

Where the lid 3 is caused to cover the case body 2, the top edges of the first and third side walls 32 and 34 run against the tilt surfaces 17a and 18a of the engaging projections 17 and 18 on the first and third side walls 5 and 7 of the case body 2 as shown in FIG. 9 so that they are gradually widened outward.

Figure 10:
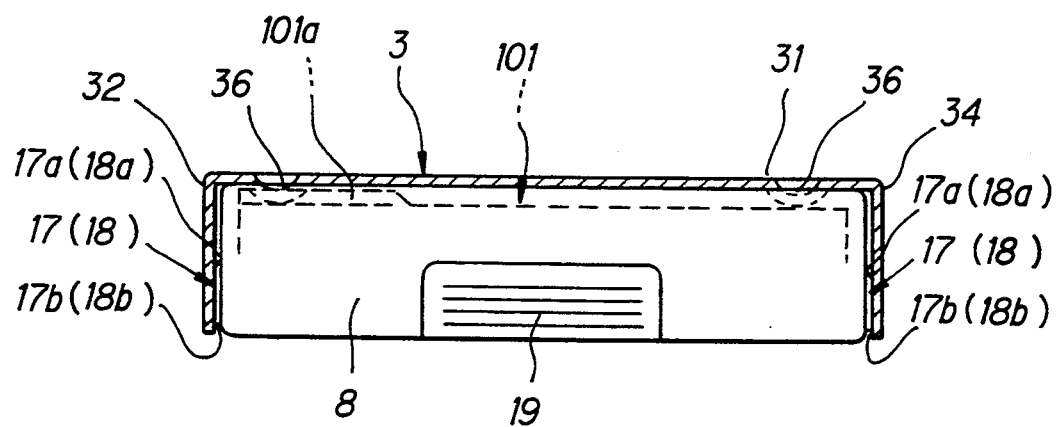
FIG. 10 is a view showing a state in which the case body of FIG. 9 is closed by the lid.

Further, when the case body 2 is inserted into the lid 3, the inner surfaces of the first and second side walls 5 and 7 of the lid 3 which have been widened outward by the tilt surfaces 17a and 18a of the projections 17 and 18 are brought into contact with the flat portions of the engaging projections 17 and 18, respectively, under a predetermined pressure directed from inside toward outside the lid 3 as shown in FIG. 10, so that the lid 3 is fitted about the case body 2 with the firmness that even when only the lid 3 is carried by one's and, the case body 2 is prevented from falling down.

As shown in FIG. 10, the support areas on the upper surface of the tape cassette 101 are thrusted downward from above by the plurality of projections 36 formed at the corners of the lid 3 to thereby press the tape cassette 101 against the supports 11 of the case body 2. Consequently, the vertical movement of the tape cassette 101 within the case body 2 is regulated.

As described above, where the lid 3 is placed over the case body 2, the finger-touch projections 19 on the second and fourth side walls 6 and 8 enter and engage the recesses 37 formed in the second and fourth side walls 33 and 35 of the lid 3 as shown in FIG. 10.

Next, the method of taking out the tape cassette 101 from the case body 2 will be described. The user may hold the case body 2 between the fingers (for example, the thumb and one of the remaining fingers) of the user's hand at the finger-touch projections 19 on the case body 2 while he pulls up the lid 3 with the other hand against the contact pressure between the flat surfaces of the projections 17 and 18 of the case body 2 and the inner wall surface of the lid 3 to thereby remove the lid 3 from the case body 2.

Then, in the above state, the user may apply his finger tips to the rear surface of the tape cassette 101 through the recess 16 formed in the third side wall 7 of the case body 2 as shown in FIG. 11.

After that, when the user moves his fingers upward in FIG. 11 so as to thrust the front surface of the tape cassette 101 against the inner surface of the first side wall portion 5 of the case body 2, the tape cassette 101 is moved to a position indicated by two-dot chain lines with its front surface side becoming a fulcrum. Therefore, for example, when the tape cassette 101 is moved until the user's remaining fingers come to be able to be inserted between the tape cassette 101 and the bottom surface 4 of the case body 2, the case body 2 may be taken out by holding the rear surface of the tape cassette 101 between two fingers.

As described above, the tilt angle $\theta_2$ of each of the outer side surfaces 25a of the fourth blades 25 of the hub locks 13 and 14 is made larger than the tilt angle of each of the outer side surfaces 24a of the third blades 24 thereof so that even when the tape cassette 101 is removed from the case body 2, the outer side surfaces 25a of the fourth blades 25 do not contact the inner peripheral surfaces of the hubs 103 and 104 and as a result, the tape cassette 101 can be smoothly taken out from the case body 2.

Next, a tape cassette case according to a second embodiment of the present invention will be described by referring to the accompanying drawings wherein parts which are commonly used with the first embodiment are designated by the same reference numerals and detailed descriptions thereof are omitted.

Figure 12:
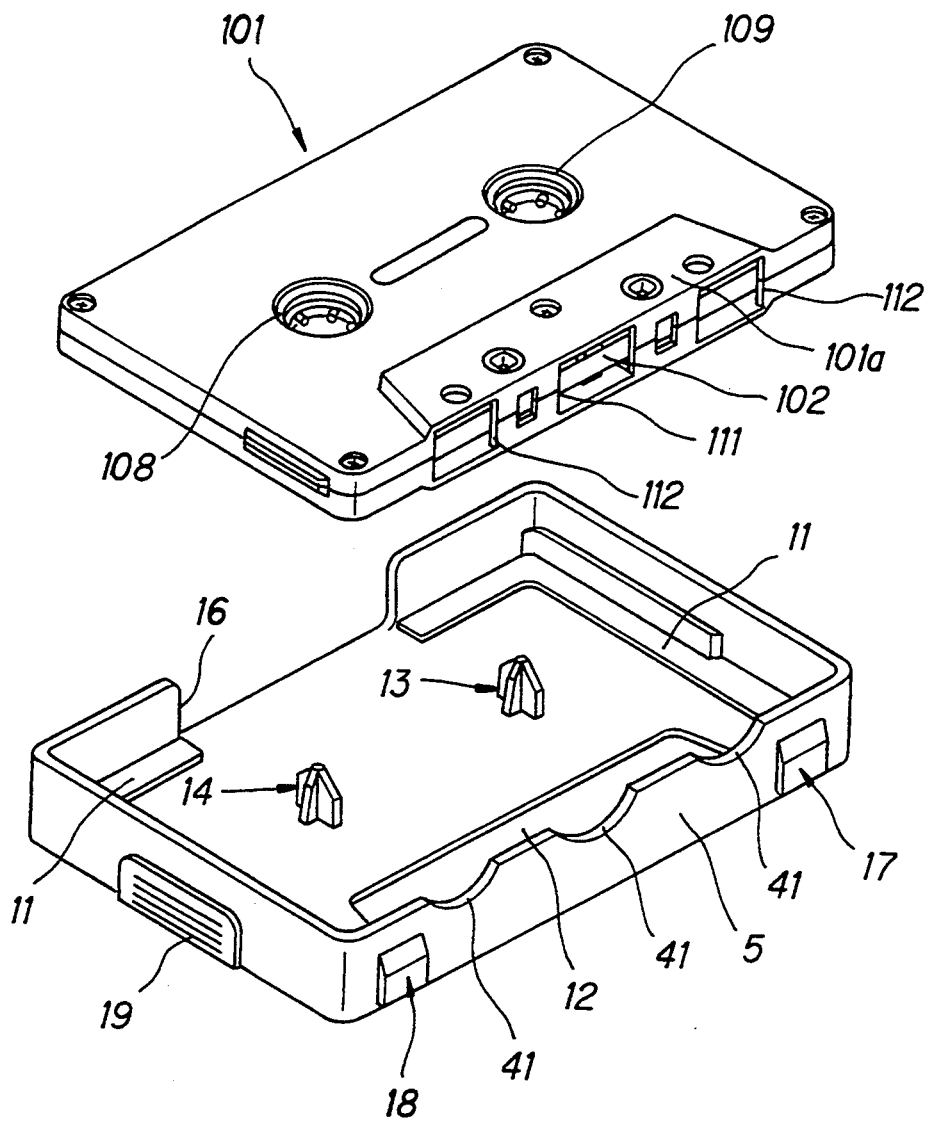
FIG. 12 is a perspective view of a case body forming part of a tape cassette case according to a second embodiment of the present invention, together with a tape cassette to be received therein.

As shown in FIG. 12, the operating section in this second embodiment differs in shape from that in the first embodiment. In the second embodiment, the first side wall 5 of the case body 2 is provided with a plurality of circular operating sections 41 which are formed by cutting the upper edge of the first side wall 5 of the case body 2. The operation sections 41 which are so formed as to correspond to the head insert opening 111 and the pinch roller insert openings 112 of the tape cassette 101 to be received within the tape cassette receiving space of the case body 2.

The method of inserting the tape cassette 101 into the case body 2 of the above structure is as follows.

Figure 13:
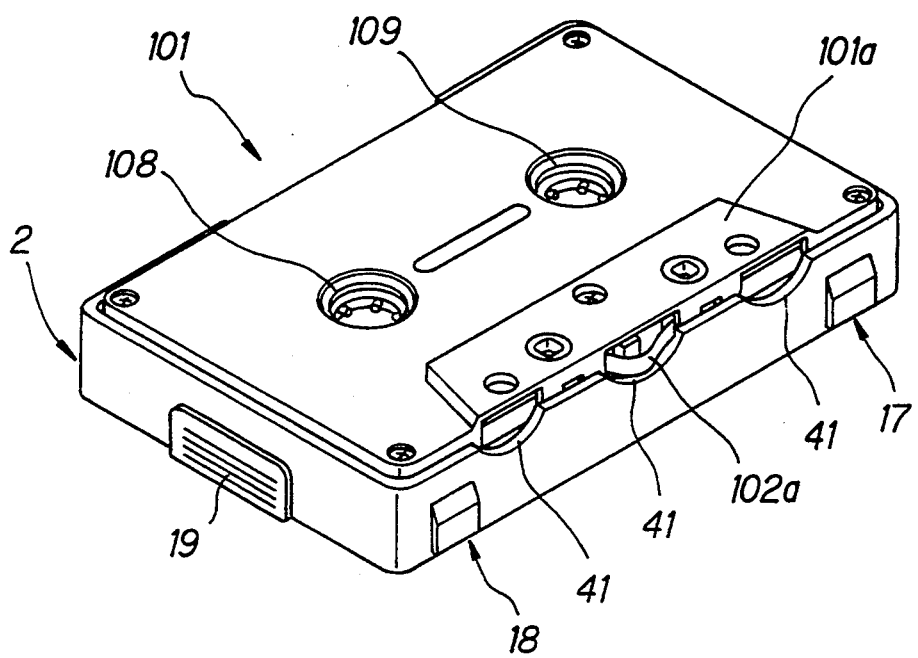
FIG. 13 is a perspective view of the case body of the tape cassette case of FIG. 12 especially in a state in which a tape cassette is received in the case body.
Figure 14A:
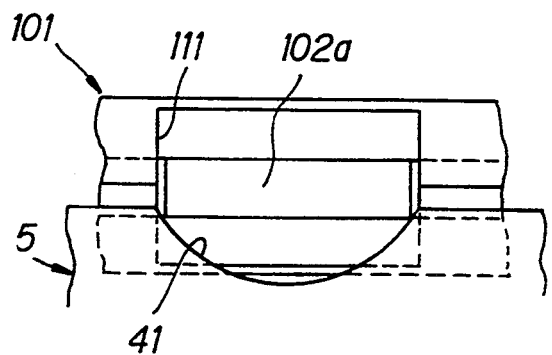
FIGS. 14A and 14B are views given for illustrating a state in which a tape cassette from which a part of a magnetic tape projects is received within the case body. That is.
Figure 14B:
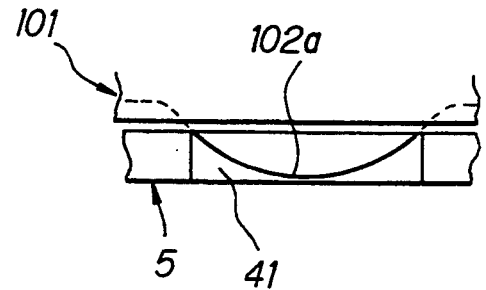
Figure 15A:
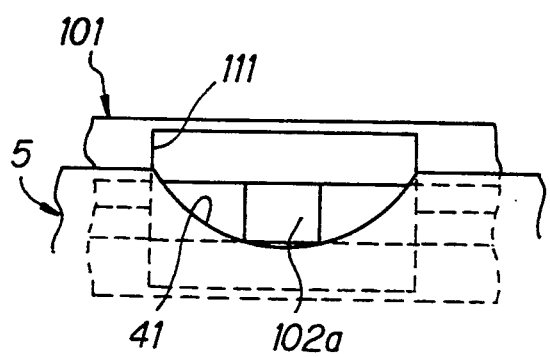
FIGS. 15A and 15B are views given for illustrating a state in which a tape cassette from which a part of a magnetic tape project is received within the case body.
Figure 15B:
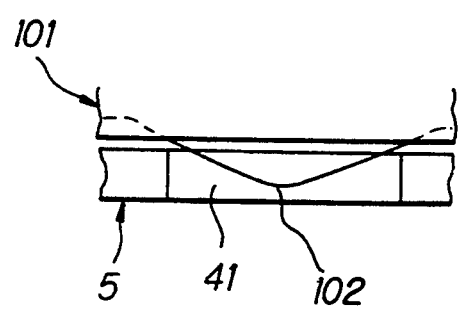
Figure 16A:
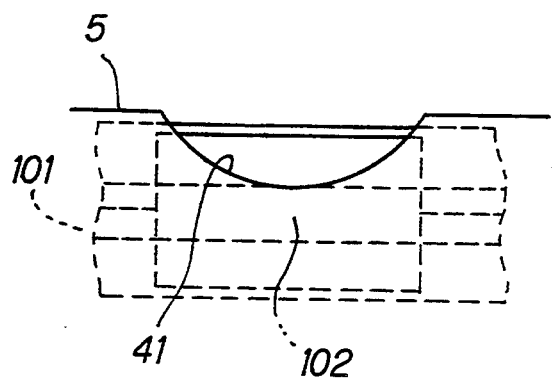
FIGS. 16A and 16B shows a state in which a tape cassette is received within the case body of the tape cassette case of FIG. 12. That is.
Figure 16B:
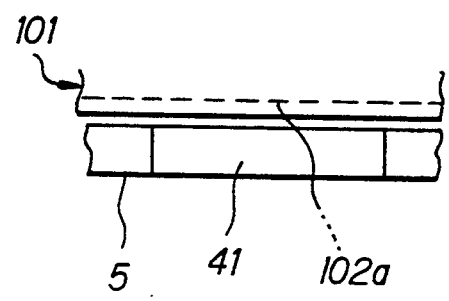

Suppose that a part of the magnetic tape 102 be projecting from the head-insert opening 111 as shown in FIG. 13 when the tape cassette 101 is inserted into the case body 2. In that case, as shown in FIG. 14A, where the tape cassette 101 is about to be inserted in the case body, both ends of the projection 102a of the magnetic tape 102 are in contact with the upper edges of one of the circular concave operating sections 41. Thus, when the tape cassette 101 is gradually pushed into the case body 2 from the state shown in FIGS. 14A and 14B, both ends of the projection 102a of the magnetic tape 102 move along the concave circular surface of the operation section 41. In this case, since the projection 102a is thrusted into the tape cassette through the operating section 41, the circular projection 102a becomes smaller as the tape cassette 101 moves down into the case body 2. That is, the amount of projection of the magnetic tape 102a shown in FIG. 14B becomes small as the tape cassette 101 is lowered into the case body 2, i.e., brought under the states shown in FIGS. 15A and 15B. Thus, when the tape cassette 101 is pushed forward from the states shown in FIGS. 15A and 15B, the projection 102a becomes gradually small and as in the case of the first embodiment, when the tape cassette 101 is completely housed within the case body 2, the projecting portion of the magnetic tape 102 is held within the tape cassette 101 as shown in FIGS. 16A and 16B. By the way, although the operating section 41 is made circular in the second embodiment, it may be a mere recess which gradually inclines from the upper edge of the first side wall 5 toward the bottom surface 4.

Next, a tape cassette case according to a third embodiment of the present invention will be described by referring to FIG. 17 wherein parts used in common with the first embodiment are designated by the same reference numerals and detailed descriptions thereof are omitted.

Figure 17:
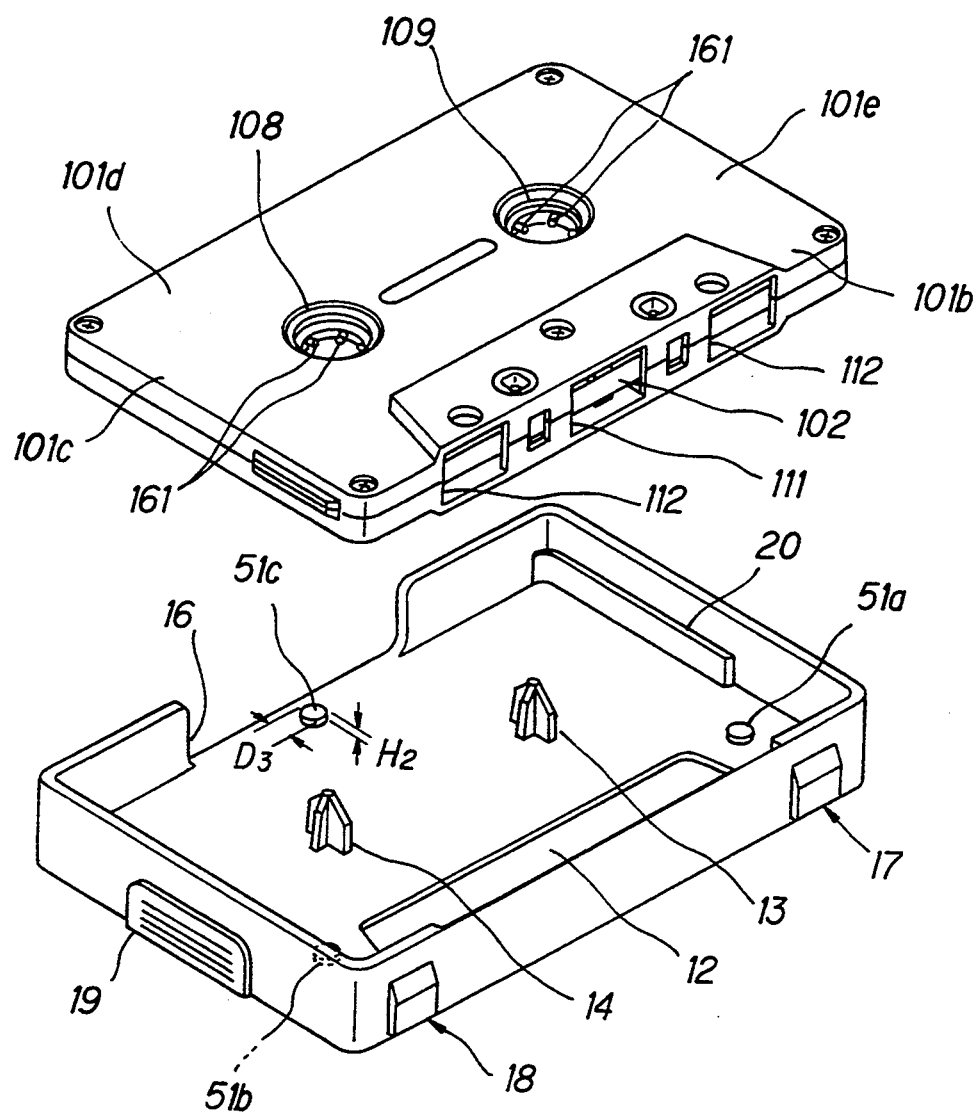
FIG. 17 is a perspective view of a case body forming part of a tape cassette case according to a third embodiment of the present invention.

FIG. 17 shows a tape cassette case 1 according to the third embodiment of the present invention.

This third embodiment represents a case in which in order to support at least three side support areas 101b, 101c and 101d of the four support areas 101b, 101c, 101d and 101e which are formed on the four sides of the tape cassette 101, respectively, three tape cassette supports 51a, 51b and 51c are provided.

As shown in FIG. 17, these three supports 51a, 51b and 51c are each in the form of a circular cylinder having a diameter $D_3$ which is substantially equal to the width $W_1$ of each of the support areas 101b, 101c, 101d and 101e and a height $H_2$ equal to that of the tape cassette support 111 of the first embodiment.

Thus, the three side support areas 101b, 101c and 101d of the tape cassette 101 housed within the case body 2 are supported by the three supports 51a, 51b and 51c of which the support 51c is positioned between the supports 51a and 51b as shown in FIG. 17.

In the first and third embodiments, the height $H_2$ of each of the tape cassette supports, 11, 51a, 51b and 51c is somewhat smaller than the height $H_1$ of the trapezoidal bulged portion 101a of the tape cassette 101 and the depth $D_1$ of the concave portion 12 for receiving the trapezoidal bulged portion is made somewhat smaller than the height $H_2$ of each of the supports 11, 51a, 51b and 51c, so that the lower surface of the trapezoidal bulged portion 101a does not contact the bottom surface of the concave section 12. By the way, in not only the first and third embodiments but also in the second embodiment, the height $H_2$ of each of the support sections 11, 51a, 51b and 51c may be made larger than the height $H_1$ of the trapezoidal bulged portion 101a so as to prevent the lower surface of the portion 101a from coming into contact with the bottom surface 4 of the case body 2, thereby avoiding the necessity of forming the concave portion 12 in the case body 2.

What is claimed is:

1. A case for a cassette tape provided with a pair of reel hubs and front openings, which comprises:
    a lower case member formed of a rectangular plate-like portion and a plurality of continuous side walls extending upright from along the four sides of the rectangular plate-like portion, either one of two opposing side walls formed along the longer sides of the plate-like portion being provided, at the upper edge thereof, with a tape operating section for allowing a portion of a tape-shaped recording medium projecting from the tape cassette to be withdrawn into the latter; and
    an upper case member formed of a rectangular plate-like portion and a plurality of continuous side walls extending upright from along the four sides of the plate-like portion,
    whereby said lower case member is closed by said upper case member when the latter is placed over the former.

2. A case according to claim 1, wherein said tape operating section has a surface inclining from the upper edge of said side wall toward the center of the rectangular plate-like portion of said lower case member.

3. A case according to claim 1, wherein said tape operating section is in the form of at least a recess formed at a position corresponding to one of the front openings of said tape cassette, said recess having a curved profile gradually inclining sharper from the upper edge of said side wall of said tape cassette so as to gradually incline from the upper edge of said side wall toward said plate-like portion.

4. A case according to claim 1, wherein the other one of the two opposing side walls extending along the longer sides of said rectangular plate-like portion of the lower case member, or either one of the two opposing side walls extending along the shorter sides of the rectangular plate-like portion of said lower case member is provided with a recess extending from the upper edge thereof to said rectangular plate-like portion.

5. A case according to claim 1, wherein said lower case member is provided with at least a projection on the outer surface of any of said plurality of side walls at a position adjacent to said rectangular plate-like portion such that when said upper case member is place over said lower case member to cover the latter, said projection thrusts the inner surface of the corresponding side wall of said upper case member thereby preventing the lower case member from separating from the upper case member.

6. A case for a tape cassette, which comprises:
a lower case member including a first rectangular plate-like portion and a plurality of continuous side walls extending upright from along the sides of the first rectangular plate-like portion; and
an upper case member including a second rectangular plate-like portion and a plurality of continuous side walls extending upright from along the sides of said second rectangular plate-like portion,
wherein said lower case is provided with at least a first projection on the outer surface of any of said continuous side walls thereof at a position adjacent the first plate-like portion so as to engage the inner surface of any of the side walls of said upper case member such that when said upper case member is placed over said lower case member to cover the latter, said lower case member is prevented from separating from said upper case member due to the existence of said projection, and
wherein said lower case member is provided with a plurality of second projections on the opposing two side walls extending along the shorter sides of the first rectangular plate-like portion thereof at positions adjacent the corners of the first plate-like portion.

7. A case according to claim 6, wherein said first projection comprises an inclined portion making a predetermined tilt angle with respect to the surface of said side wall on which said projection is formed and a flat portion formed continuous with said inclined portion and capable of coming into contact with the inner surface of the corresponding side wall of said upper case member.

8. A case according to claim 6, wherein each of said plurality of second projections is formed such that it extends downward from the intermediate portion of the side wall on which it is formed so that when the upper case member is placed to cover the lower case member, the lower end of said projection comes to lie at a position above the lower edge of the opposing side wall of the upper case member.

9. A case for a tape cassette, which comprises:
a lower case member including a first rectangular plate-like portion and a plurality of continuous side walls extending upright from along the sides of said first rectangular plate-like portion, said first rectangular plate-like portion being provided with support means projecting therefrom so as to support a plurality of support areas of the tape cassette; and
an upper case member including a second rectangular plate-like portion and a plurality of continuous side walls extending upright from along the sides of said second plate-like portion,
whereby when said upper case member is placed over said lower case member to cover the latter, said lower case member is closed by said upper case member, and
wherein said support means comprises:
first and second support portions running parallel to each other along the shorter sides of the first rectangular plate-like portion of said lower case member, and
a third support portion formed along either one of the longer sides of said first rectangular plate-like portion of said lower case member.

10. A case according to claim 9, wherein said third support portion is formed at substantially the center of either one of the longer sides of the first rectangular plate-like portion of said lower case member.

11. A case according to claim 9, wherein the second rectangular plate-like portion of said upper case member is provided with a projection coming into contact with a tape cassette received between both of said lower and upper case members when said both case members are combined together.

12. A case for a tape cassette having a pair of reel hubs, said case comprises:
a lower case member comprising a first rectangular plate-like portion and a plurality of continuous side wall portions extending upright from along the sides of said first plate-like portion, said lower case member being provided, on a first wall of said plurality of side walls, with a first recess ranging from the upper edge of said said first wall down to the first plate-like portion, and a plurality of circular operating sections formed in a second wall of said plurality of side walls, said second wall being located opposite said first wall, said plurality of circular operating sections being formed so as to correspond to a head insert opening and pinch roller insert openings of a tape cassette which is received in said case, said circular opening sections each being so shaped as to smoothly displace any magnetic tape which projects out of the head insert opening or pinch roller openings, back toward said tape cassette as the tape cassette is pressed down into said low case member; and
an upper case member comprising a second rectangular plate-like portion and a plurality of side walls extending upright from along the sides of said second rectangular plate-like portion;
wherein said lower case member is closed by said upper case member when the latter is placed over the former.

13. A case according to claim 12, wherein the first rectangular plate-like portion of said lower case member is provided with a pair of projections extending from said first rectangular plate-like portion so as to engage the reel hubs of the tape cassette to be received between said lower and upper case members thereby inhibiting the rotations of said reel hubs and also provided with a concave section for receiving a trapezoidal projection of said tape cassette being received.

14. A case according to claim 12, wherein the first rectangular plate-like portion of said lower case member is provided with support means for supporting the tape cassette received in said lower case member.

15. A case according to claim 14, wherein the second rectangular plate-like portion of said upper case member is provided with at least a projection which comes into contact with the upper surface of the tape cassette received in said lower case member when said upper case member is placed on said lower case member to cover the latter.

16. A case according to claim 12, wherein said lower case member is provided, on the outer surfaces of the opposing two side walls formed along the shorter sides of the first rectangular plate-like portion thereof, with projections, respectively, and said upper case member is provided, in the opposing two side walls extending along the second rectangular plate-like portion thereof, with recesses, respectively, at positions corresponding to the projections of said lower case member.

17. A case for a tape cassette having a pair of reel hubs, said case comprises:
- a lower case member comprising a first rectangular plate-like portion and a plurality of continuous side wall portions extending upright from along the sides of said first plate-like portion, said lower case member being provided, on a first wall of said plurality of side walls, with a first recess ranging from the upper edge of said first wall down to the first plate-like portion; and
- an upper case member comprising a second rectangular plate-like portion and a plurality of side walls extending upright from along the sides of said second rectangular plate-like portion;
- wherein said lower case member is closed by said upper case member when the latter is placed over the former; and
- wherein said lower case member is provided, on the outer surface of any of said the plurality of side walls thereof, with at least a projection at a position adjacent to the first rectangular plate-like portion thereof such that when said upper case member is placed over said lower case member to cover the latter, said projection engages the corresponding inner surface of the side wall of said outer case member to thrust the latter outward thereby preventing the lower case member from separating from said upper case member.

* * * * *